US010668310B2

(12) United States Patent
Ernfjäll

(10) Patent No.: US 10,668,310 B2
(45) Date of Patent: Jun. 2, 2020

(54) FIRE EXTINGUISHING SYSTEM

(71) Applicant: Fogmaker International AB, Växjö (SE)

(72) Inventor: Johnny Ernfjäll, Lammhult (SE)

(73) Assignee: FOGMAKER INTERNATIONAL AB (SE)

(*) Notice: Subject to any disclaimer, the term of this patent is extended or adjusted under 35 U.S.C. 154(b) by 519 days.

(21) Appl. No.: 15/321,236

(22) PCT Filed: Jun. 25, 2015

(86) PCT No.: PCT/EP2015/064357
§ 371 (c)(1),
(2) Date: Dec. 22, 2016

(87) PCT Pub. No.: WO2015/197756
PCT Pub. Date: Dec. 30, 2015

(65) Prior Publication Data
US 2017/0189730 A1  Jul. 6, 2017

(30) Foreign Application Priority Data

Jun. 27, 2014 (EP) ..................................... 14174657

(51) Int. Cl.
*A62C 35/68* (2006.01)
*F16K 11/07* (2006.01)
*A62C 37/44* (2006.01)

(52) U.S. Cl.
CPC .............. *A62C 35/68* (2013.01); *A62C 37/44* (2013.01); *F16K 11/0716* (2013.01)

(58) Field of Classification Search
CPC ......... A62C 35/68; A62C 37/36; A62C 31/02; A62C 35/62; A62C 37/44; F16K 11/0716
(Continued)

(56) References Cited

U.S. PATENT DOCUMENTS 3,122,350 A   2/1964  Reeder
6,209,654 B1  4/2001  Curless
(Continued)

FOREIGN PATENT DOCUMENTS

EP   2 308 567 A2   4/2011
EP   2 462 993 A2   6/2012
(Continued)

*Primary Examiner* — Cody J Lieuwen
*Assistant Examiner* — Steven M Cernoch
(74) *Attorney, Agent, or Firm* — Condo Roccia Koptiw LLP

(57) ABSTRACT

The present invention relates to a fire extinguishing system comprising a fire extinguishing medium container (3), a first (5) and second (7) fire extinguishing sub-systems, and a valve assembly (9) fluidly connecting the fire extinguishing medium container (3) to each of the first (5) and second (7) fire extinguishing sub-systems. The fire extinguishing system (1) further comprises a first and a second detection conduit arrangement (19, 21) connected to the valve assembly (9) and arranged to activate the fire extinguishing system (1), wherein the valve assembly (9) comprises a valve chamber (33), a valve member (35) being movably arranged in the valve chamber (33), the valve member (35) having: i) a first force receiving surface (45) arranged to be subjected to a first force ($F_1$) exerted by a force applicator of the first detection conduit arrangement (19), and ii) a second force receiving surface (47) arranged to be subjected to a second force ($F_2$) exerted by a second force application arrangement of the second detection conduit arrangement (21).

14 Claims, 9 Drawing Sheets

(58) Field of Classification Search
USPC .......................................................... 137/79
See application file for complete search history.

(56) References Cited

U.S. PATENT DOCUMENTS

| | | |
|---|---|---|
| 2008/0105442 A1 | 5/2008 | Reilly et al. |
| 2011/0011600 A1* | 1/2011 | Eckholm ................ A62C 37/44 169/46 |
| 2012/0145416 A1* | 6/2012 | Chattaway ............. A62C 35/68 169/43 |
| 2014/0034481 A1* | 2/2014 | Waddell ............... G01R 33/282 204/157.15 |

FOREIGN PATENT DOCUMENTS

| | | |
|---|---|---|
| EP | 2 602 521 A2 | 6/2013 |
| GB | 2 252 163 A | 7/1992 |
| WO | WO 2009/126155 A1 | 10/2009 |

* cited by examiner

FIRE EXTINGUISHING SYSTEM

CROSS REFERENCE TO RELATED APPLICATIONS

This application is the National Stage Entry under 35 U.S.C. § 371 of Patent Cooperation Treaty Application No. PCT/EP2015/064357, filed 25 Jun. 2015, which claims priority to EPC Application No. 14174657.8, filed Jun. 27, 2014, the contents of which are incorporated by reference herein in their entireties.

FIELD OF THE INVENTION

The present invention relates to a fire extinguishing system comprising a fire extinguishing medium container, a first and a second fire extinguishing sub-system, and a valve assembly fluidly connecting the fire extinguishing medium container to each of the first and second fire extinguishing sub-systems and arranged for selectively distributing fire extinguishing medium from the fire extinguishing medium container to the first or to the second fire extinguishing sub-system upon activation of the fire extinguishing system.

BACKGROUND OF THE INVENTION

A fire extinguishing system of this type may be used where fire may occur at different locations and the space is limited, such as, e.g., in vehicles.

EP 2 462 993 discloses a fire extinguishing system for vehicles. The system comprises a fire suppressant source, a distributor valve, a distribution system and a control system. The divert valve is movable between an initial first position which communicates extinguishing agent into a first distribution network and a second position which communicates extinguishing agent into a second distribution network.

This fire extinguishing system has the drawback that the reliability may be regarded as relatively poor. Furthermore, the system may be regarded as complex.

SUMMARY OF THE INVENTION

It is an object of the present invention to overcome the above described drawback, and to provide an improved fire extinguishing system.

This and other objects that will be apparent from the following summary and description are achieved by a fire extinguishing system according to the appended claims.

According to one aspect of the present disclosure there is provided a fire extinguishing system comprising a fire extinguishing medium container, a first and a second fire extinguishing sub-system, and a valve assembly fluidly connecting the fire extinguishing medium container to each of the first and second fire extinguishing sub-systems and arranged for selectively distributing fire extinguishing medium from the fire extinguishing medium container to the first or to the second fire extinguishing sub-system upon activation of the fire extinguishing system, wherein the fire extinguishing system further comprising a first and a second detection conduit arrangement connected to the valve assembly and arranged to activate the fire extinguishing system, wherein the valve assembly comprises a valve chamber, a valve member being movably arranged in the valve chamber and a fluid passage portion being arranged in at least one of the valve member and the valve chamber, the valve member having a first force receiving surface arranged to be subjected to a first force exerted by a force applicator of the first detection conduit arrangement and for moving the valve member to a first position, in which said fluid passage portion is aligned for distribution of fire extinguishing medium to the second fire extinguishing sub-system, and a second force receiving surface arranged to be subjected to a second force exerted by a force applicator of the second detection conduit arrangement and for moving the valve member to a second position, in which said fluid passage portion is aligned for distribution of fire extinguishing medium to the first fire extinguishing sub-system.

The fluid passage portion thus allows fire extinguishing medium, such as e.g. water under high pressure, to be supplied from a common storage to one of the first and second fire extinguishing sub-systems. One single fire extinguishing medium container may thus supply fire extinguishing medium to one of two separate fire extinguishing sub-systems. Such a fire extinguishing system may be installed in applications where the space is limited and there is a need for separate extinguishing lines. Furthermore, a cost-efficient system may be provided since one single fire extinguishing medium container is needed.

Furthermore, this fire extinguishing system may be fully automatic since e.g. pressurized detection conduits or electrical detection arrangements may be connected to the valve assembly. Hence, a very robust and reliable fire extinguishing system may be provided. Also, the system does not need to be powered by electricity if pressurized detection conduits are used.

According to one embodiment at least one of said force applicators comprises pressurized fluid. Preferably each of said force applicators comprises pressurized fluid. Such a force applicator may thus comprise pressurized fluid or a device, such as a pyrotechnical charge, capable of generating pressurized fluid in the form of pressurized gas.

According to one embodiment at least one of said force applicators comprises pressurized liquid. Preferably each of said force applicators comprises pressurized liquid.

According to one embodiment said valve member is arranged to move along a linear path along the valve chamber.

According to one embodiment said first and second force receiving surfaces are opposed to each other.

According to one embodiment said valve member is a valve plunger.

According to one embodiment said valve plunger is cylindrical.

According to one embodiment said fluid passage portion is arranged in said valve member.

According to one embodiment the fluid passage portion is formed by a recess in the valve member.

According to one embodiment the first said valve member comprises at least a first blocking portion which is arranged to prevent distribution of fire extinguishing medium to the first or to the second fire extinguishing sub-system.

According to one embodiment at least one of the first and second detection conduit arrangement comprises a liquid-filled detection conduit. This is advantageous since a liquid-filled detection conduit may be installed in a compartment where the normal operating temperature is relatively high.

According to one embodiment at least one of the first and second detection conduit arrangement comprises a detection conduit formed from a thermoplastic material, such as a thermoplastic fluoropolymer. This has the advantage that the detection conduit may resist relatively high temperatures which is advantageous in applications where the normal operating temperature is relatively high.

According to one embodiment at least one of said force applicators is a linear actuator.

According to one embodiment said linear actuator is a pyrotechnical actuator.

According to one embodiment the linear actuator comprises a piston.

According to one embodiment at least one of the first and second detection conduit arrangement comprises an electrical detection cable.

These and other aspects of the invention will be apparent from and elucidated with reference to the claims and the embodiments described hereinafter.

BRIEF DESCRIPTION OF THE DRAWINGS

The invention will now be described in more detail with reference to the appended drawings in which.

DESCRIPTION OF PREFERRED EMBODIMENTS

Figure 1:
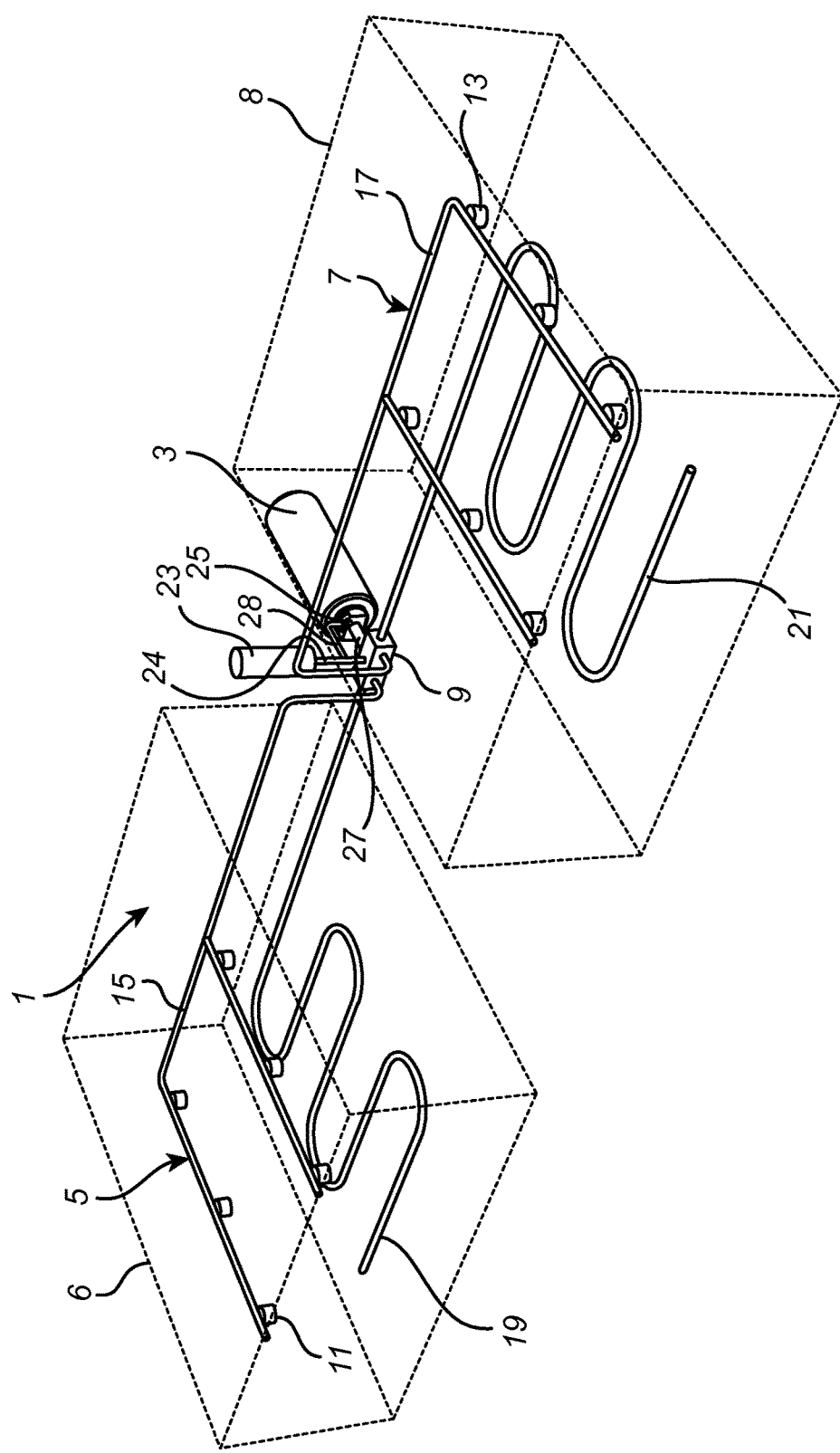
FIG. 1 is a schematic perspective view of a fire extinguishing system according to an embodiment of the present disclosure.

FIG. 1 illustrates a fire extinguishing system 1 according to an embodiment of the present disclosure. The fire extinguishing system 1 may e.g. be installed in a vehicle, or in a building, with several compartments. On release of the extinguishing system 1 extinguishing liquid in the form of atomised mist is sprayed in the compartment where a fire has been detected to cool and extinguish the fire.

The fire extinguishing system 1 comprises a fire detection system, a container 3 for fire extinguishing medium, a first fire extinguishing sub-system 5, a second fire extinguishing sub-system 7 and a valve assembly 9 for distribution of fire extinguishing medium to the first or to the second fire extinguishing sub-system 5, 7. Each of the first and second fire extinguishing sub-systems 5, 7 comprises several nozzles 11, 13 and a piping system 15, 17 and is fluidly connected to the fire extinguishing medium container 3 by the valve assembly 9.

The fire detection system comprises a first and a second detection conduit 19, 21 each of which is filled with pressurized detection fluid, in the form of pressurized liquid, and connected to the valve assembly 9. In this embodiment the fire detection system comprises a common detection fluid container 23 holding pressurized detection liquid and connected to the valve assembly 9 for pressurizing each of the first and second detection conduits 19, 21.

The detection liquid container 23 is of a design known per se and comprises pressurized detection fluid. In this embodiment detection fluid in the form of detection liquid is used.

On delivery the liquid container 23 is filled with detection liquid, such as e.g. glycol-based anti-freeze, and pressurized with nitrogen gas to approximately 20-24 bar.

The detection liquid container 23 is fluidly connected to the valve assembly 9 by a detection fluid tube 24.

Each of the first fire extinguishing sub-system 5 and the first detection conduit 19 is arranged in a first compartment 6, and each of the second fire extinguishing sub-system 7 and the second detection conduit 21 is arranged in a second compartment 8, as schematically illustrated in FIG. 1. The first and second compartments 6, 8 may be separated from each other by walls. By way of an example the first compartment 6 may be a first engine compartment and the second compartment 8 may be a second engine compartment. By way of a second example the first compartment may be an engine compartment and the second compartment may be a passenger compartment. Furthermore, one of the compartments may e.g. be a compartment for electrical components, battery, hydraulic components, cab heater or engine heater. Also, the fire extinguishing system may be installed in a building with separated rooms.

The fire extinguishing medium container 3 is of a design known per se and forms two chambers, a first chamber for extinguishing liquid and a second chamber for a driving gas. The container chambers are separated from each other by means of a piston displaceably arranged in the container 3 and sealed with regard to the cylindrical wall by means of sealing rings. On delivery the fire extinguishing medium container 3 may be filled with extinguishing liquid and drive gas to approximately 105 bars.

A release valve 25, which is known per se, is arranged on the fire extinguishing medium container 3. The release valve 25 is fluidly connected to the valve assembly 9 by a tube 27. The release valve 25 is arranged to open supply of fire extinguishing medium from the fire extinguishing medium container 3 to the valve assembly 9 when a fire is detected in one of the first and second compartments 6, 8 by the detection system. To this end the release valve 25 is fluidly connected to the detection medium tube 24 by means of a tube 28. The release valve 25 is thus arranged to open supply of extinguishing liquid from the fire extinguishing medium container 3 to the valve assembly 9 in response to a pressure drop in any of the first and second detection conduits 19, 21 caused by rupture of the first 19 or second detection conduit 21. When the pressure in the detection fluid tube 24 has fallen to approximately 7 bar the release valve 25 on the fire extinguishing medium container 3 is activated and the fire extinguishing system 1 is released. Then, extinguishing liquid is sprayed into the engine compartment where fire has been detected. When the release valve 25 is opened extinguishing liquid is discharged from the pressure container 3 to the valve assembly 9 through the tube 27 fluidly connecting the valve assembly 9 to the fire extinguishing medium container 3. The advantage of activating the release valve 25 this way. i.e. by means of pressurized detection conduits, is that it provides for an automatic system that works without the need of electricity or other external energy.

Figure 2A:
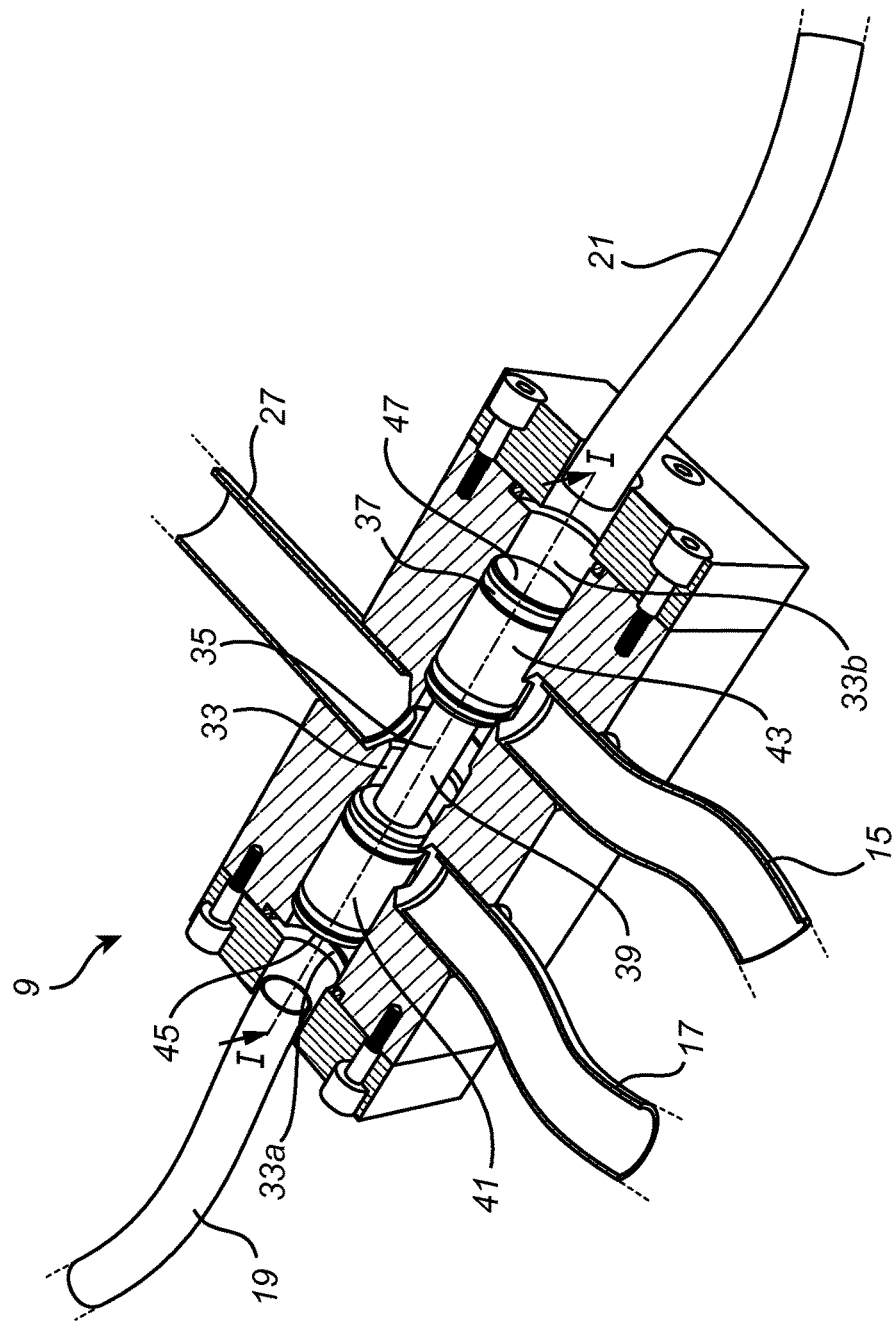
FIG. 2a is a schematic section view of a valve assembly of the fire extinguishing system shown in FIG. 1.

Now referring to FIG. 2a, the valve assembly 9 comprises a valve chamber 33 and a valve member, in the form of a cylindrical valve plunger 35, displaceably arranged in the valve chamber 33 and sealed with regard to a cylindrical wall of the valve chamber 33 by means of sealing rings 37. The valve chamber 33 comprises a first sub-chamber 33a to which the first detection conduit 19 is fluidly connected, and a second sub-chamber 33b to which the second detection conduit 21 is fluidly connected. The first and second valve sub-chambers 33a, 33b are separated from each other by the movable valve plunger 35.

The cylindrical valve member 35 comprises a fluid passage portion 39 for distribution of fire extinguishing medium from the fire extinguishing medium container 3 to the first or to the second fire extinguishing sub-systems 5, 7. In this embodiment the fluid passage portion 39 is formed by a circumferential recess in the cylindrical valve member 35. In an alternative embodiment the fluid passage portion may instead, or as a complement to a recess, comprise channels through the valve member.

The valve member 35 further comprises a first blocking portion 41 arranged at one side of the fluid passage portion 39 and a second blocking portion 43 arranged at the other side of the fluid passage portion 39.

Each of the first and second fire extinguishing sub-systems 5, 7 is fluidly connected the valve chamber 33 of the valve assembly 9. To this end each of the first and second pipe systems 15, 17 is fluidly connected to the valve chamber 33 of the valve assembly 33, as illustrated in FIG. 2a.

The valve member 35 comprises a first force receiving surface, in the form of a first pressure surface 45, arranged to be exposed to a first pressure force exerted by pressurized fluid in the first detection conduit 19, which is fluidly connected to the first valve chamber 33a, and for moving the valve member 35 in a direction away from the first detection conduit 19.

The valve member 35 further comprises a second force receiving surface, in the form of a second pressure surface 47, arranged to be exposed to a second pressure force exerted by pressurized fluid in the second detection conduit 21, which is fluidly connected to the second valve chamber 33b, and for moving the valve member 35 in a direction away from the second detection conduit 21.

Figure 2B:
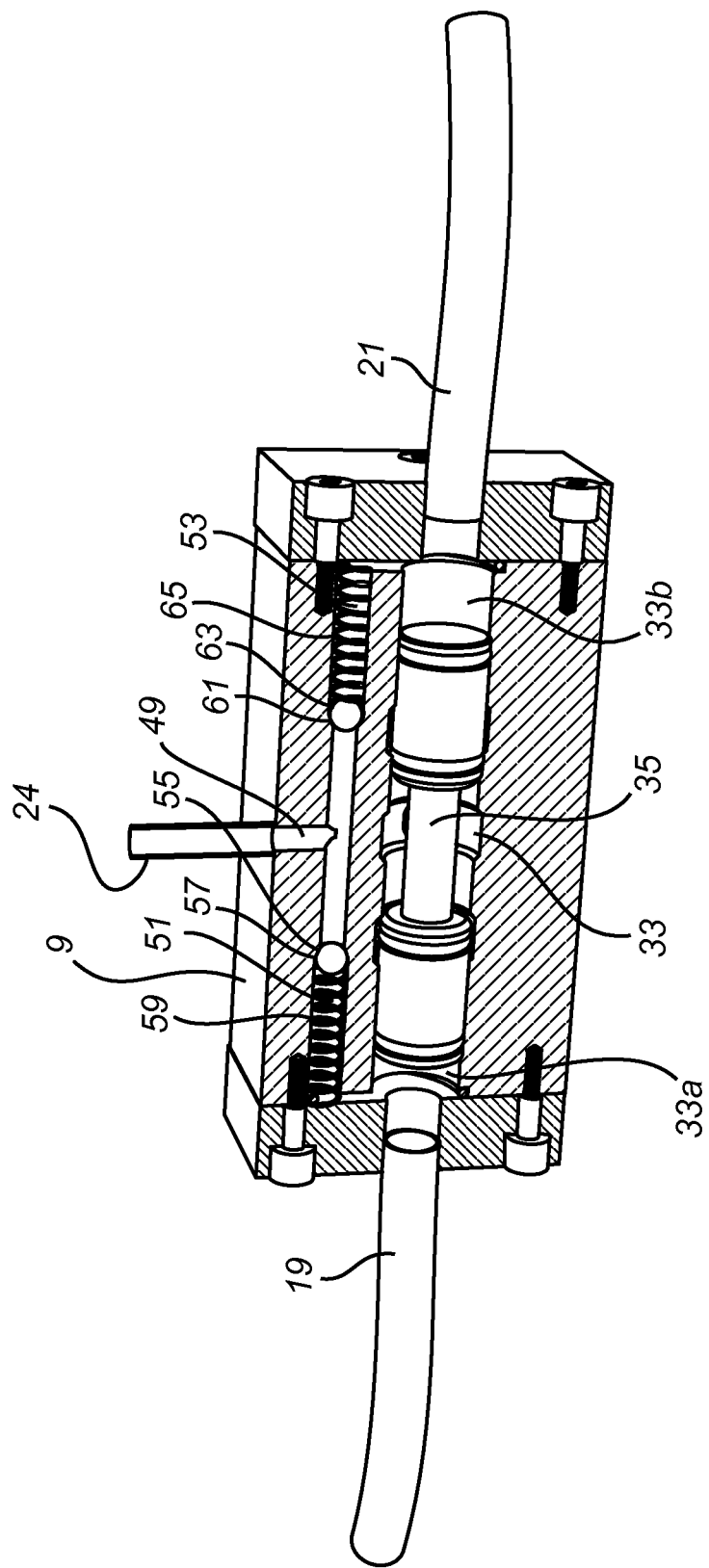
FIG. 2b is a schematic section view of a valve assembly of the fire extinguishing system shown in FIG. 1.

Now referring to FIG. 2b the valve assembly 9 comprises a common detection fluid channel 49. The common detection fluid channel 49 branches into a first sub-channel 51 fluidly connecting the detection fluid container 23 to the first valve chamber 33a, and into a second sub-channel 55 fluidly connecting the detection fluid container 23 to the second sub-chamber 33b.

The first sub-channel 51 comprises a first valve seat 55 against which a first ball 57 is seated. The first ball 57 is pressed against the first valve seat 55 by means of a first spring 59 supported by an inner wall of the first sub-channel 51. The first valve seat 55, the first ball 57 and the first spring 59 form part of a first check valve preventing fluid flow from the first detection conduit 19 to the common channel 49.

The second sub-channel 53 comprises a second valve seat 61 against which a second ball 63 is seated. The second ball 63 is pressed against the second valve seat 61 by means of a second spring 65. The second valve seat 61, the second ball 63 and the second spring 65 form part of a second check valve preventing detection fluid from flowing from the second detection conduit 21 to the common channel 49.

Figure 3A:
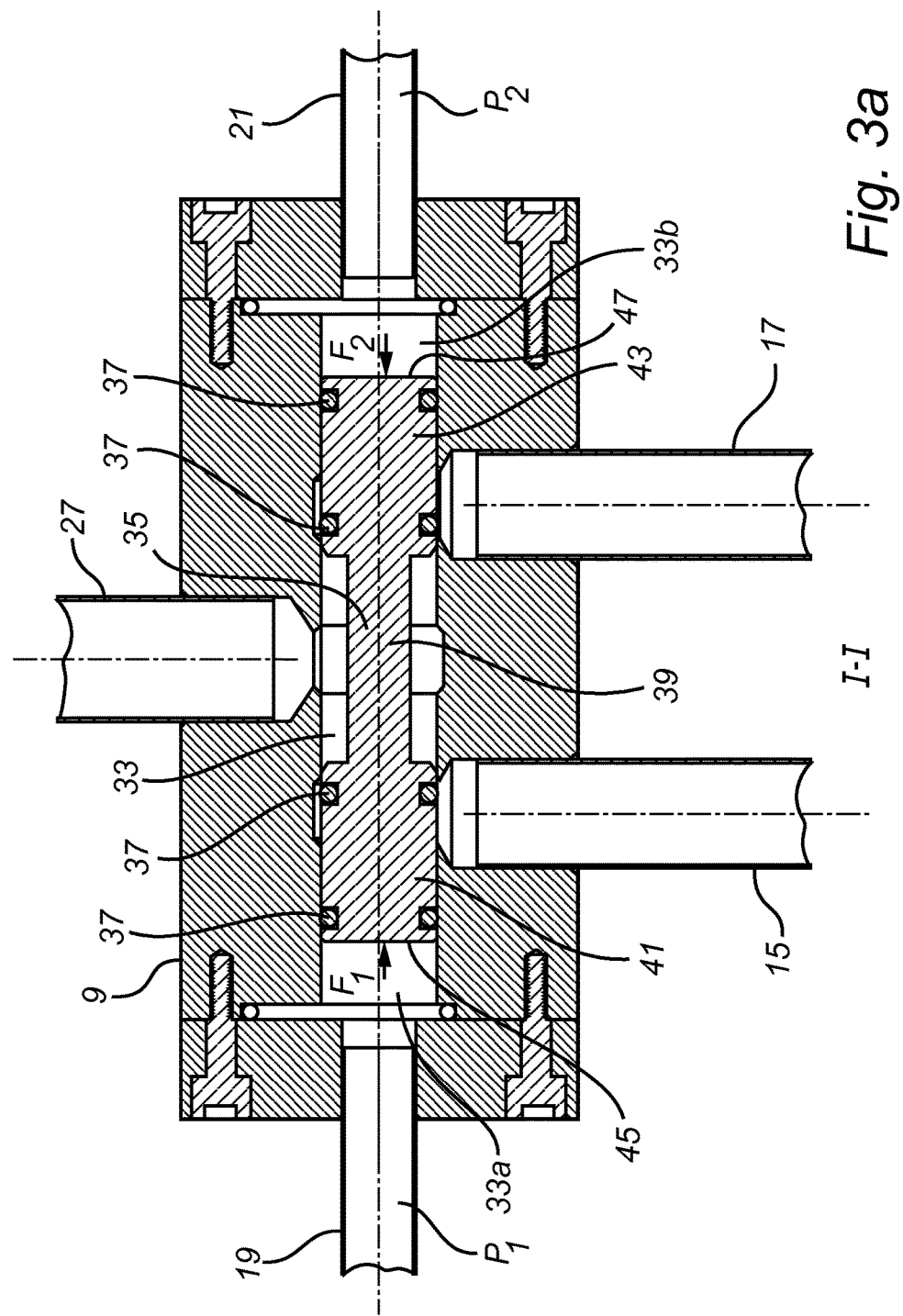
FIGS. 3a-c are section views and illustrate the function of the valve assembly of the fire extinguishing system shown in FIGS. 2a-b.
Figure 3B:
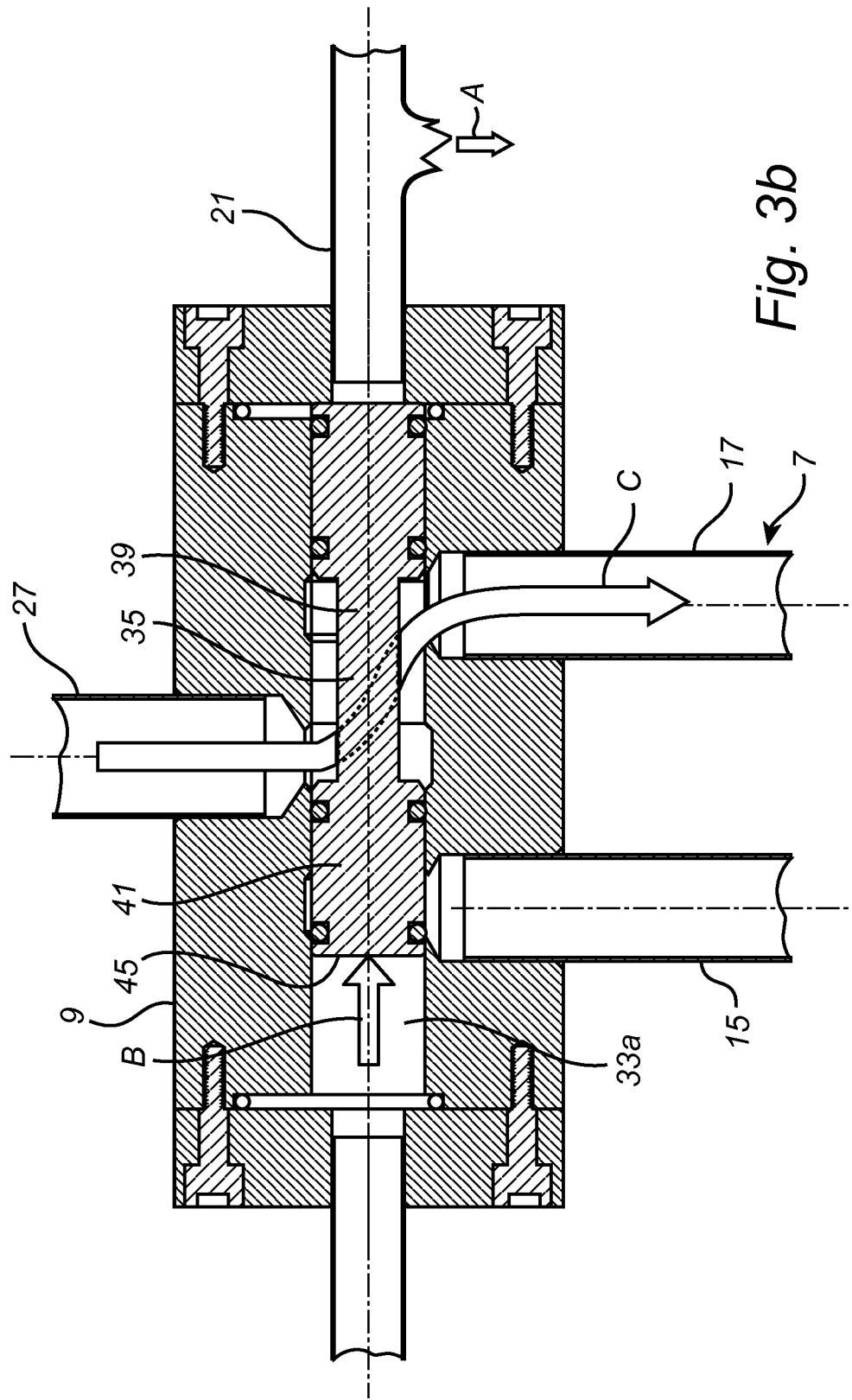
Figure 3C:
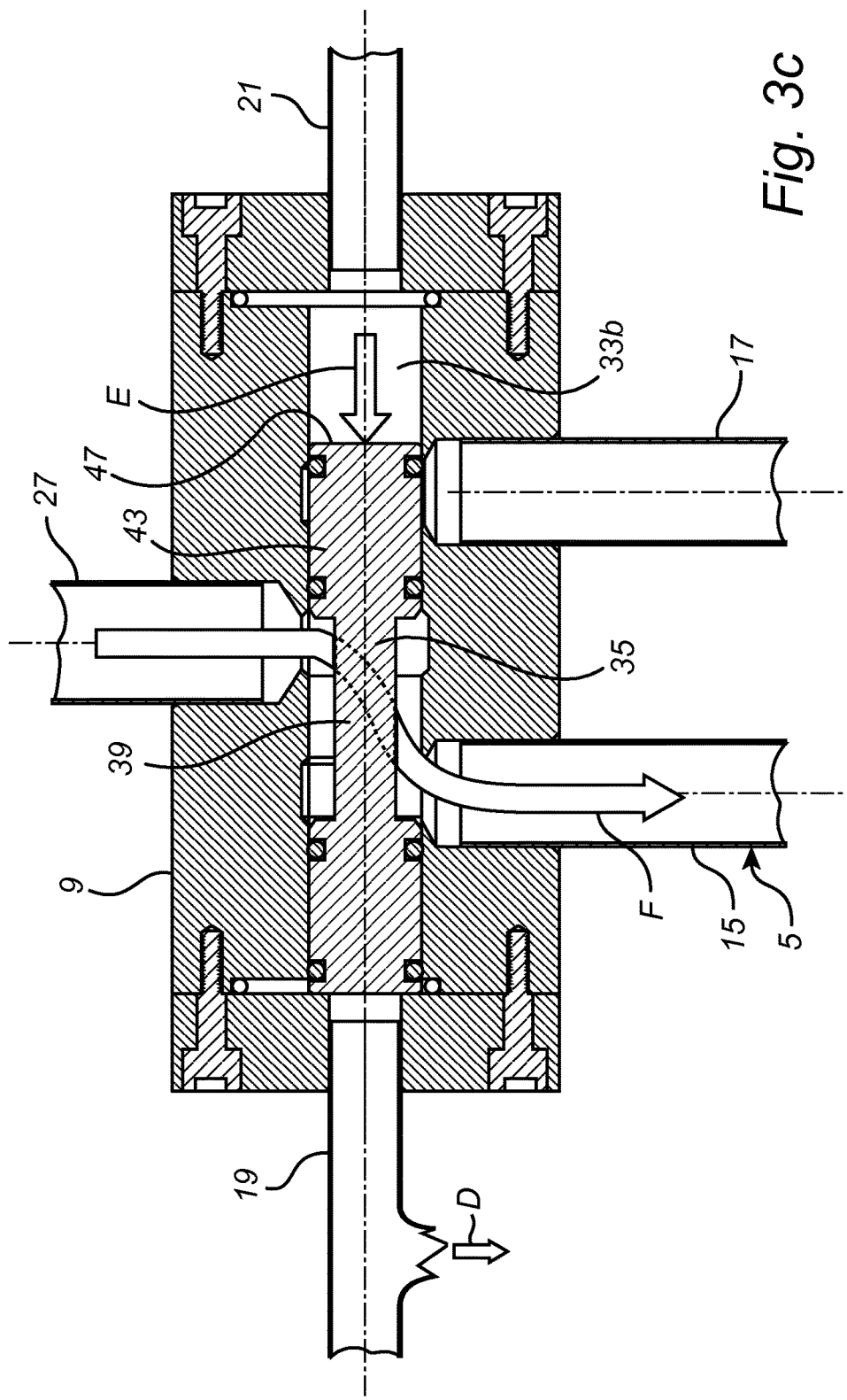

With reference to FIGS. 3a-c the function of the fire extinguishing system 1 will be described hereinafter.

FIG. 3a shows a state in which each of the first and second detection conduct 19, 21 is intact and filled with pressurized detection liquid. The pressure of the detection liquid in the first and second detection conduits 19, 21 is then $P_1$ and $P_2$, respectively. A first pressure force $F_1$ is exerted on the first pressure surface 45 of the valve member 35 and a second pressure force $F_2$ is exerted on the second pressure surface 47 of the valve member 35. Hence, the pressurized liquid in the first detection conduit 19 forms a first force applicator and the pressurized liquid in the second detection conduit 21 forms a second force applicator.

FIG. 3b illustrates fire in the second compartment 8, i.e. where the second detection conduit 21 and the second fire extinguishing sub-system 7 are arranged. In the event of fire in the second compartment 8 the second detection conduit 21 bursts due to heat generated by the fire. Consequently, detection liquid leaks from the detection conduit 21, as illustrated by arrow A in FIG. 3b. Then, the pressure in the second valve chamber 33b drops and the second pressure force $F_2$ is removed. The first check valve prevents fluid from being evacuated from the first detection conduit 19. Hence, the first pressure force $F_1$ is maintained since the first valve chamber 33a is still pressurized. The valve member 35 is then moved to a first position, illustrated in FIG. 3b, by the pressure force $F_1$ exerted on the first pressure surface 45 of the valve member 35 by pressurized detection liquid in the first valve chamber 33a, i.e. by the first force applicator, as illustrated by the arrow B in FIG. 3b. The valve member 35 is moved to the first position upon a pressure difference between the first and second valve chambers 33a, 33b of approximately 2-5 bar. In the first position the fluid passage portion 39 is positioned for distribution of fire extinguishing medium from the fire extinguishing medium container 3 to the tube 17 of the second extinguishing sub-system 7.

Also, the pressure in each of the detection tube 24 and connection tube 28, which are fluidly connected to the second detection conduit 21, drops upon leakage of detection fluid from the second detection conduit 21. When the pressure in the detection fluid tube 24 has fallen to approximately 7 bar the release valve 25 on the fire extinguishing medium container 3 is activated. As soon as the release valve 25 is opened extinguishing fluid is supplied to the second fire extinguishing sub-system 7, as illustrated by the arrow C in FIG. 3b. In the first valve member position distribution of fire extinguishing medium to the first fire extinguishing sub-system 5 is prevented by the first blocking portion 41 of the valve member 35. Fire extinguishing medium is thus supplied only to the second sub-system 7 when the valve member 35 assumes the first valve member position.

FIG. 3c illustrates fire in the first compartment 6, i.e. where the first detection conduit 19 and the first fire extinguishing sub-system 5 are arranged. In the event of fire in the first compartment 6 the first detection conduit 19 bursts due to heat generated by the fire. Consequently, detection liquid leaks from the first detection conduit 19, as illustrated by arrow D in FIG. 3c. Then, the pressure in the first valve chamber 33a drops and the first pressure force $F_1$ is removed. The second check valve prevents fluid from being evacuated from the second detection conduit 21. Hence, the second pressure force $F_2$ is maintained since the second valve chamber 33b is still pressurized. The valve member 35 is then moved to a second position, illustrated in FIG. 3c, by the pressure force $F_2$ exerted on the second pressure surface 47 of the valve member 35 by pressurized detection liquid in the second valve chamber 33b, i.e. by the second force applicator, as illustrated by the arrow E in FIG. 3c. The valve member 35 is moved to the second position upon a pressure difference between the first and second valve chambers 33a, 33b of approximately 2-5 bar. In the second valve member position the fluid passage portion 39 is positioned for distribution of fire extinguishing medium from the fire extinguishing container 3 to the tube 15 of the first extinguishing sub-system 5.

Also, the pressure in each of the detection tube 24 and the connection tube 28, which are fluidly connected to the first detection conduit 19, drops upon leakage of detection fluid from the first detection conduit 19. When the pressure in the detection fluid tube 24 has fallen to approximately 7 bar the release valve 25 on the fire extinguishing medium container 3 is activated. As soon as the release valve 25 is opened extinguishing fluid is supplied to the first fire extinguishing sub-system 5, as illustrated by the arrow F in FIG. 3c.

In the second valve member position distribution of extinguishing fluid to the second fire extinguishing sub-system 7 is prevented by the second blocking portion 43 of the valve member 35. Fire extinguishing medium is thus supplied only to the second fire extinguishing sub-system 5 when the valve member 35 assumes the second valve member position.

Figure 4:
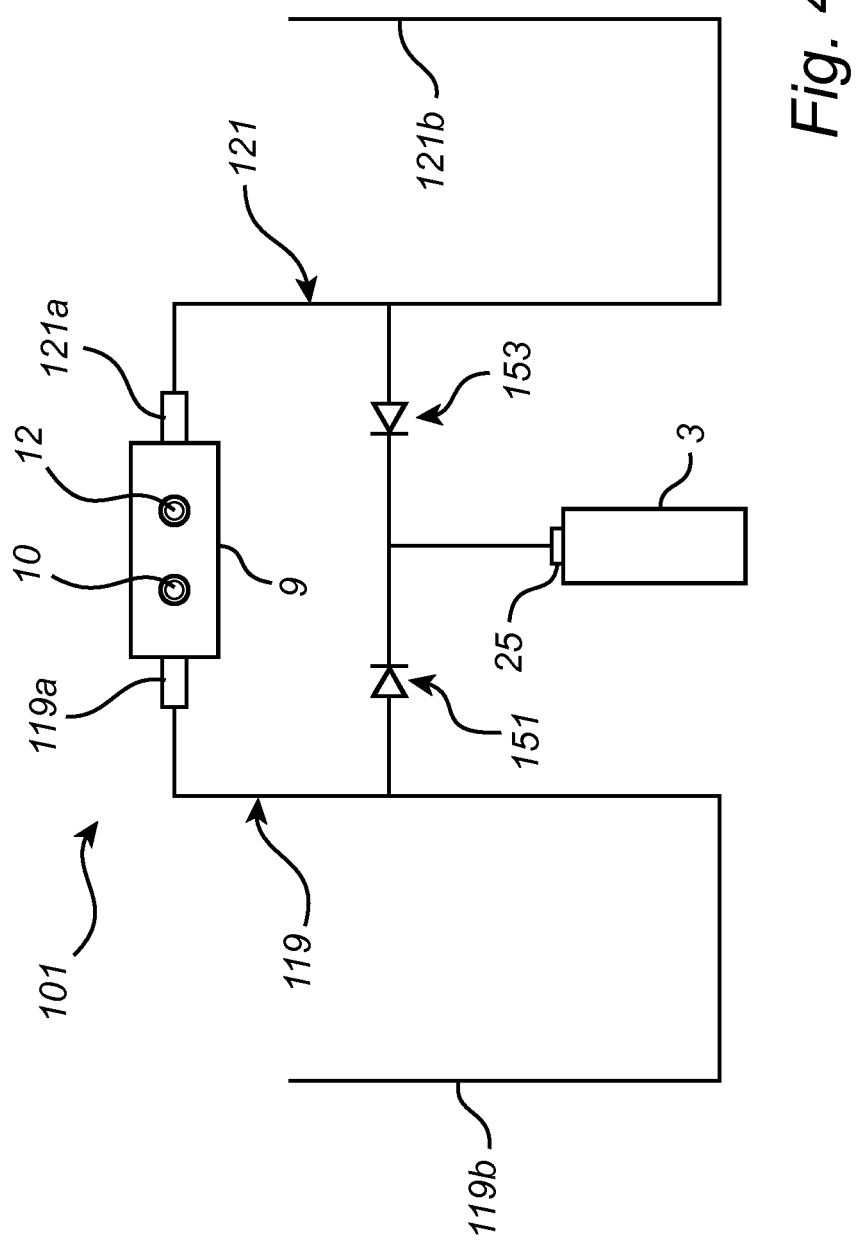
FIG. 4 is a schematic perspective view of a fire extinguishing system according to a second embodiment of the present disclosure.

Hereinafter a fire extinguishing system 101 according to a second embodiment will be described with reference to FIGS. 4 and 5a-b. Many features disclosed in the first embodiment are also present in the second embodiment with similar reference numerals identifying similar or same features. Having mentioned this, the description will focus on explaining the differing features of the second embodiment.

The second embodiment differs from the first embodiment in that it comprises electrical detection conduits instead of pressurized detection conduits.

The fire extinguishing system 101 thus comprises a first and a second electrical detection conduit arrangement 119, 121. The fire extinguishing system 101 further comprises a container 3 for fire extinguishing medium, a first fire extinguishing sub-system (not shown), a second fire extinguishing sub-system (not shown), a valve assembly 9, which is fluidly connected to the fire extinguishing medium container 3 by a tube (not shown), for distribution of fire extinguishing medium to the first or to the second fire extinguishing sub-system and a release valve 25 arranged to open supply of fire extinguishing medium from the fire extinguishing medium container 3 to the valve assembly 9.

In this embodiment the second fire extinguishing sub-system, which is arranged in the compartment where the second detection conduit arrangement 121 is arranged, is fluidly connected to the valve chamber 33 via a first valve port 10 of the valve assembly 9 and the first fire extinguishing sub-system, which is arranged in the compartment where the first detection conduit arrangement 121 is arranged, is fluidly connected to the valve chamber 33 via a second valve port 12 of the valve assembly 9 while in the first embodiment the first fire extinguishing sub-system is fluidly connected to the valve chamber 33 via the first valve port 10 and the second fire extinguishing sub-system is fluidly connected to the valve chamber 33 via the second valve port 12. The reason for the crosswise connection of the fire extinguishing sub-systems in the second embodiment is that, upon detection of fire in e.g. the first compartment, the piston member 35 is moved in the opposite direction compared to the corresponding piston movement in the first embodiment.

The first detection conduit arrangement 119 comprises a first force applicator, in the form of a pyrotechnical actuator 119a, and an energized electrical detection cable 119b.

The second detection conduit arrangement 121 comprises a second force applicator, in the form of a pyrotechnical actuator 121a, and an energized electrical detection cable 121b.

Each of the pyrotechnical actuators 119a, 121a comprises a pyrotechnical charge capable of generating pressurized gas.

Each of the first and second detection cables 119b, 121b comprises two adjacent conductors and a meltable insulating layer therebetween. In the event of fire the insulating layer melts due to heat generated by the fire. Then, an electrical impulse is generated in the detection cable.

The first detection cable 119b is connected to each of the pyrotechnical actuator 119a and the release valve 25 and arranged to activate each of the pyrotechnical actuator 119a and the release valve 25 in case of fire in the compartment where the first detection conduit arrangement 119 is installed. In the event of fire in the compartment where the first detection conduit arrangement is arranged each of the first pyrotechnical actuator 119a and the release valve 25 thus receives an electrical impulse from the detection cable 119b.

The second detection cable 121b is connected to each of the second pyrotechnical actuator 121a and the release valve 25 and arranged to activate each of the second pyrotechnical actuator 121a and the release valve 25 in case of fire in the compartment where the second detection conduit arrangement 121 is arranged. In the event of fire in the compartment where the second detection conduit arrangement 121 is arranged each of the second pyrotechnical actuator 121a and the release valve 25 thus receives an electrical impulse from the second detection cable 121b.

The release valve 25 may e.g. be activated in a known manner by means of a pyrotechnical charge arranged to be ignited by an electrical impulse from any of the first and second electrical detection cable 119b, 121b.

A first diode 151 is arranged to secure that only the second pyrotechnical actuator 121a is activated when an electrical impulse is generated by the second detection cable 121b.

A second diode 153 is arranged to secure that only the first pyrotechnical actuator 119a is activated when an electrical impulse is generated by the first detection cable 119b.

Figure 5A:
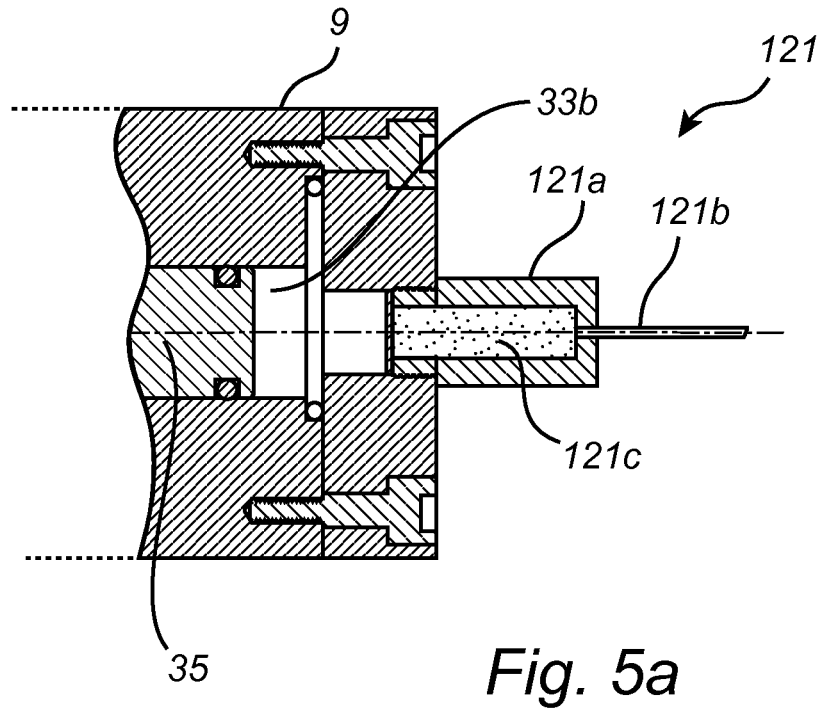
FIGS. 5a-b are section views and illustrate the function of the fire extinguishing system shown in FIG. 4.
Figure 5B:
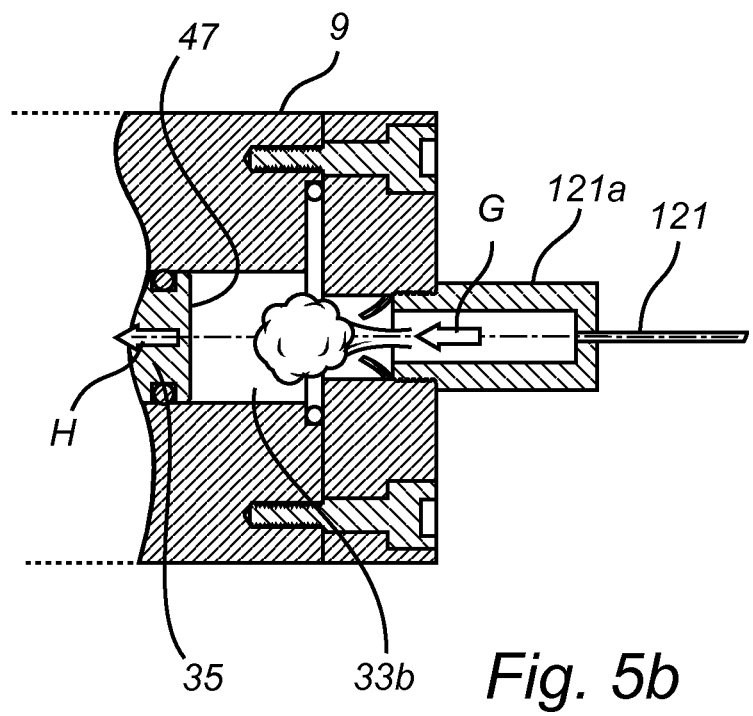

Now referring to FIG. 5a, the pyrotechnical actuator 121a of the second detection conduit arrangement 121 comprises a pyrotechnical charge 121c which is arranged to be initiated by an electrical impulse from the second detection cable 121b. Upon initiation of the pyrotechnical charge 121c pressurized gas is generated and forwarded into the second valve chamber 33b, as illustrated by arrow G in FIG. 5b. The pressurized gas exerts a pressure force on the force receiving surface 47 of the valve member 35. Then, the valve member 35 is moved to a valve member position, in which the fluid passage portion 39 of the valve member 35 is aligned for distribution of fire extinguishing medium to the second fire extinguishing sub-system, by the force applied by pressurized gas in the second valve chamber 33b, as illustrated by the arrow H in FIG. 5b.

Figure 6A:
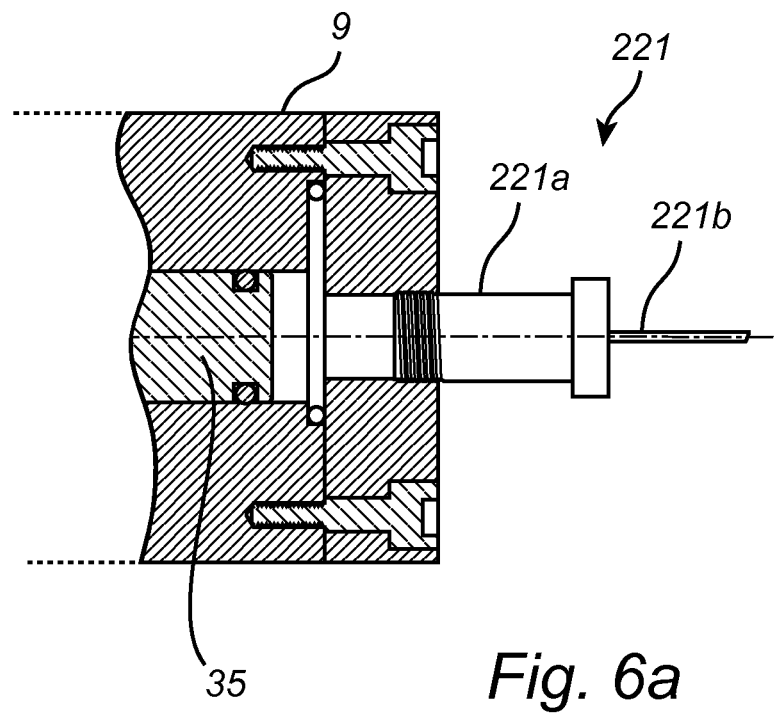
FIGS. 6a-b are section views and illustrate the function of a fire extinguishing system according to a third embodiment of the present disclosure.
Figure 6B:
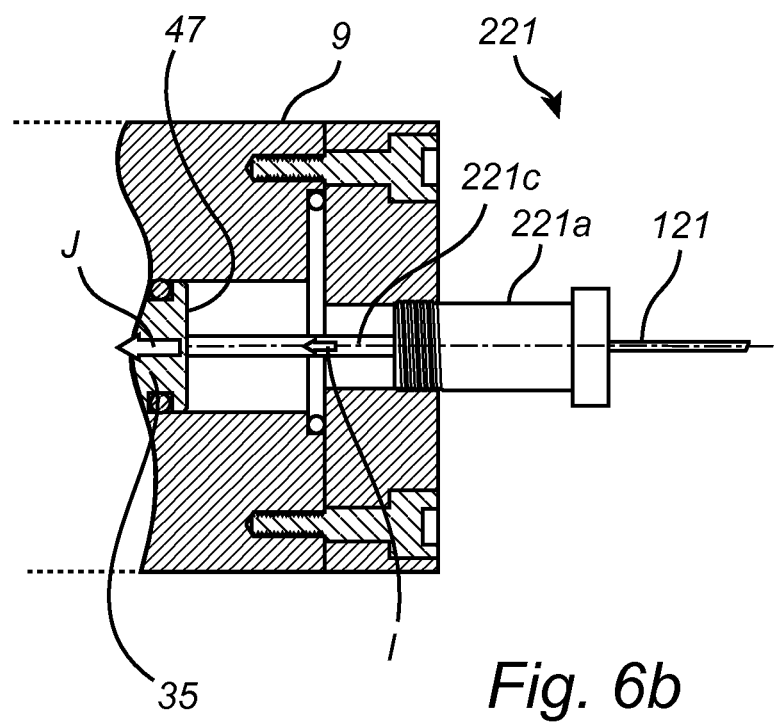

Hereinafter a fire extinguishing system according to a third embodiment will be described with reference to FIGS. 6a-b. Many features disclosed in the second embodiment are also present in the third embodiment with similar reference numerals identifying similar or same features. Having mentioned this, the description will focus on explaining the differing features of the third embodiment.

The third embodiment differs from the second embodiment in that each of the first and second force applicator comprises a piston. FIG. 6a shows a part of the second detection conduit arrangement 221. The second detection conduit arrangement 221 comprises a force applicator, in the form of a pyrotechnical piston actuator 221a, and an energized electrical detection cable 221b. The pyrotechnical piston actuator 221a comprises a pyrotechnical charge (not shown) capable of generating pressurized gas. The pyrotechnical charge of the pyrotechnical actuator 221a is arranged to be initiated by an electrical impulse from the second detection cable 221b, and a piston 221c, illustrated in FIG. 6b. Upon initiation of the pyrotechnical charge the piston is moved towards the valve member 35, as illustrated by arrow I in FIG. 6b. As soon as the piston 221c contacts the valve member 35 a force is exerted on the force receiving surface 47 of the valve member 35. Then, the valve member 35 is moved to a valve member position, in which the fluid passage portion 39 of the valve member 35 is aligned for distribution of fire extinguishing medium to the second fire extinguishing sub-system, by the force exerted by the piston 221c of the pyrotechnical piston actuator 221a, as illustrated by the arrow J in FIG. 6b.

It will be appreciated that numerous variants of the embodiments described above are possible within the scope of the appended claims.

Hereinbefore it has been described that the fire extinguishing medium may be a fluid in the form of a liquid. It is appreciated that the fire extinguishing medium may be a fluid in the form of a gas, such as, e.g., Carbon dioxide, Nitrogen, Argon or compressed air.

Hereinbefore is has been described that detection fluid in the form of detection liquid may be used. It is however realised that detection fluid in the form of detection gas, such as e.g. nitrogen, may be used instead of detection liquid. Then, the detection conduit is preferably gas-tight. For instance, a gas-tight detection hose formed from polyamide may be used.

The invention claimed is:

1. A fire extinguishing system, comprising:
   a fire extinguishing medium container;
   a first fire extinguishing sub-system and a second fire extinguishing sub-system;
   a valve assembly comprising a valve chamber, a valve member movably arranged in the valve chamber, and a fluid passage portion arranged in at least one of the valve member or the valve chamber, the valve assembly fluidly connecting the fire extinguishing medium container to each of the first and second fire extinguishing sub-systems and arranged for selectively distributing fire extinguishing medium from the fire extinguishing medium container to the first or second fire extinguishing sub-system upon activation of the fire extinguishing system; and
   a first detection conduit arrangement and a second detection conduit arrangement connected to the valve assembly and arranged to activate the fire extinguishing system, the first detection conduit arrangement comprising a first force applicator, the second detection conduit arrangement comprising a second force applicator, and the first and second force applicators configured to exert first and second forces for moving the valve member;
   wherein the valve member comprises:
      a first force receiving surface arranged to be subjected to the first force exerted by the first force applicator of the first detection conduit arrangement and for moving the valve member to a first position in which the fluid passage portion is aligned for distribution of fire extinguishing medium to the second fire extinguishing sub-system, and
      a second force receiving surface arranged to be subjected to the second force exerted by the second force applicator of the second detection conduit arrangement and for moving the valve member to a second position in which the fluid passage portion is aligned for distribution of fire extinguishing medium to the first fire extinguishing sub-system; and
   wherein at least one of the first force applicator of the first detection conduit arrangement or the second force applicator of the second detection conduit arrangement comprises pressurized fluid.

2. The fire extinguishing system according to claim 1, wherein the first and second force receiving surfaces are opposed to each other.

3. The fire extinguishing system according to claim 1, wherein at least one of the force applicator of the first detection conduit arrangement or the force applicator of the second detection conduit arrangement comprises pressurized liquid.

4. The fire extinguishing system according to claim 1, wherein the valve member is arranged to move along a linear path along the valve chamber.

5. The fire extinguishing system according to claim 1, wherein the valve member is a valve plunger.

6. The fire extinguishing system according to claim 5, wherein the valve plunger is cylindrical.

7. The fire extinguishing system according to claim 1, wherein the fluid passage portion is arranged in the valve member.

8. The fire extinguishing system according to claim 1, wherein the valve member further comprises a blocking portion arranged to prevent distribution of fire extinguishing medium to the first or second fire extinguishing sub-system.

9. The fire extinguishing system according to claim 1, wherein at least one of the first or second detection conduit arrangement comprises a liquid-filled detection conduit.

10. The fire extinguishing system according to claim 1, wherein at least one of the first or second detection conduit arrangement comprises a detection conduit formed from a thermoplastic material.

11. The fire extinguishing system according to claim 10, wherein the thermoplastic material comprises a thermoplastic fluoropolymer.

12. The fire extinguishing system according to claim 1, wherein at least one of the force applicator of the first detection conduit arrangement or the force applicator of the second detection conduit arrangement is a linear actuator.

13. The fire extinguishing system according to claim 12, wherein the linear actuator is a pyrotechnical actuator.

14. The fire extinguishing system according to claim 12, wherein at least one of the first or second detection conduit arrangement comprises an electrical detection cable.

* * * * *